US010248245B2

(12) United States Patent
Wang

(10) Patent No.: US 10,248,245 B2
(45) Date of Patent: Apr. 2, 2019

(54) RESOLVING TOUCH AND PRESS FOR MULTIPLE INPUT OBJECTS

(71) Applicant: Synaptics Incorporated, San Jose, CA (US)

(72) Inventor: Ying Wang, Fremont, CA (US)

(73) Assignee: Synaptics Incorporated, San Jose, CA (US)

(*) Notice: Subject to any disclaimer, the term of this patent is extended or adjusted under 35 U.S.C. 154(b) by 335 days.

(21) Appl. No.: 15/088,039

(22) Filed: Mar. 31, 2016

(65) Prior Publication Data

US 2017/0285836 A1 Oct. 5, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0414* (2013.01); *G06F 2203/04105* (2013.01); *G06F 2203/04108* (2013.01)

(58) Field of Classification Search
CPC . G06F 2203/04105; G06F 2203/04108; G06F 3/0412; G06F 3/0414; G06F 3/0416; G06F 3/044
See application file for complete search history.

(56) References Cited

U.S. PATENT DOCUMENTS

2014/0368260 A1* 12/2014 Tanada ................ G06F 3/04883
327/517
2015/0378491 A1* 12/2015 Worfolk ................ G06F 3/0414
345/174

* cited by examiner

*Primary Examiner* — LaTanya Bibbins
(74) *Attorney, Agent, or Firm* — Ferguson Braswell Fraser Kubasta PC

(57) ABSTRACT

A processing system for an input device, including: sensor circuitry configured to receive resulting signals from a plurality of force sensors of the input device; and processing circuitry configured to: determine a first position of a first input object and a second position of a second input object on a surface of the input device; determine a plurality of force values based on the resulting signals; calculate a first aggregate force metric for a first region of the input region based on a first subset of the plurality of force values; determine that the first region has an input force based on a first comparison involving the first aggregate force metric; calculate a first distance between the first position and a first region and a second distance between the second position and the first region; and determine that the first input object is applying the input force in response to the first distance being smaller than the second distance.

20 Claims, 4 Drawing Sheets

RESOLVING TOUCH AND PRESS FOR MULTIPLE INPUT OBJECTS

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect finger, styli, or pens.

SUMMARY

In general, in one aspect, embodiments relate to a processing system for an input device. The processing system comprises: sensor circuitry configured to receive resulting signals from a plurality of force sensors of the input device; and processing circuitry configured to: determine a first position of a first input object and a second position of a second input object on a surface of the input device; determine a plurality of force values based on the resulting signals; calculate a first aggregate force metric for a first region of the input region based on a first subset of the plurality of force values; determine that the first region comprises an input force based on a first comparison comprising the first aggregate force metric; calculate a first distance between the first position and a first region and a second distance between the second position and the first region; and determine that the first input object is applying the input force in response to the first distance being smaller than the second distance.

In general, in one aspect, embodiments relate to a method for operating a processing system for an input device comprising a surface. The method comprises: determining a first position of a first input object and a second position of a second input object on the surface; receiving a plurality of resulting signals from a plurality of force sensors; determining a plurality of force values for the plurality of force sensors based on the plurality of resulting signals; calculating a first aggregate force metric for a first region of the surface based on a first subset of the plurality of force values; determining that the first region comprises an input force based on a first comparison comprising the first aggregate force metric; calculating a first distance between the first position and the first region and a second distance between the second position and the first region; and determining that the first input object is applying the input force to the surface in response to the first distance being smaller than the second distance.

In general, in one aspect, embodiments relate to an input device. The input device comprises: a surface; a plurality of force sensors below the surface; and a processing system that: determines a first position of a first input object and a second position of a second input object on the surface; receives a plurality of resulting signals from the plurality of force sensors; determines a plurality of force values for the plurality of force sensors based on the plurality of resulting signals; calculates a first aggregate force metric for a first region of the surface based on a first subset of the plurality of force values; determines the first region comprises an input force based on a first comparison comprising the first aggregate force metric; calculates a first distance between the first position and the first region and a second distance between the second position and the first region; and determines that the first input object is applying the input force in response to the first distance being smaller than the second distance.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
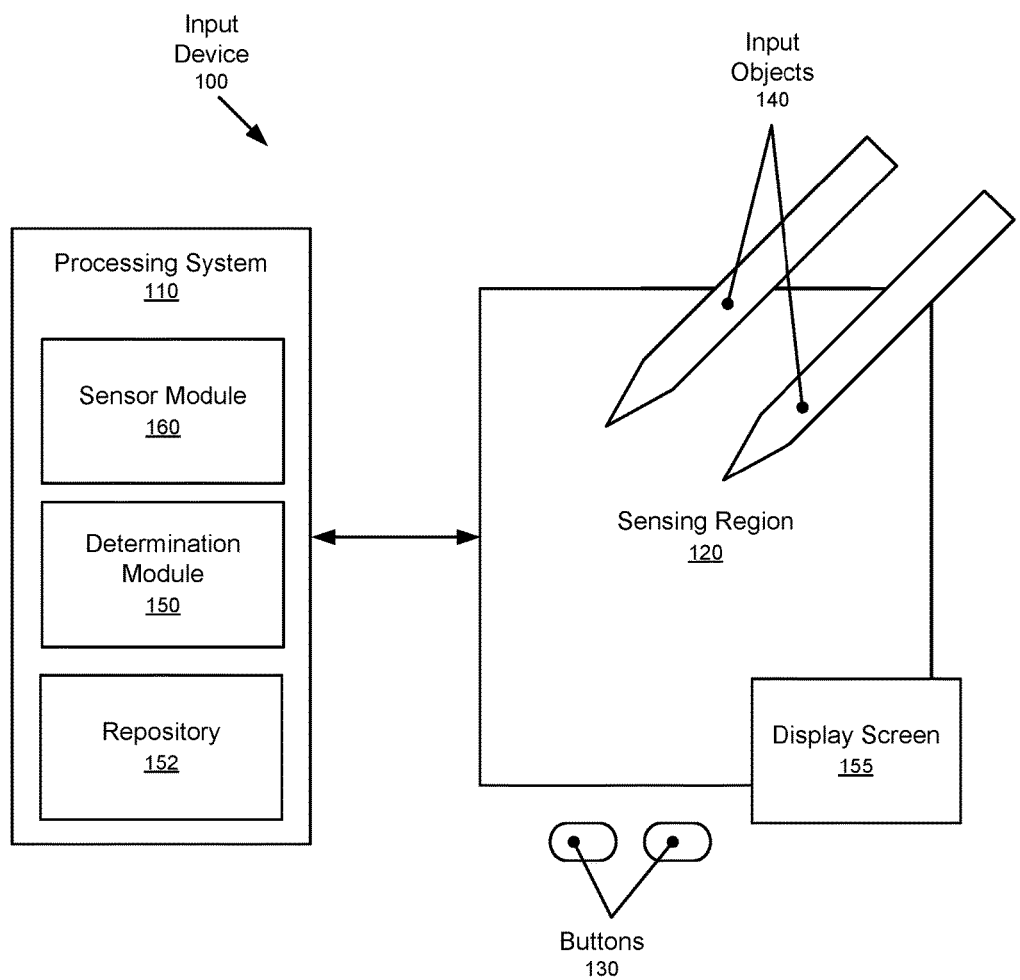
FIG. 1 and FIG. 2 show block diagrams of an input device in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects (140) include fingers and styli, as shown in FIG. 1. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen (155) may share physical elements. For example, some embodiments may utilize some of the same electrical components for displaying and sensing. In various embodiments, one or more display electrodes of a display device may configured for both display updating and input sensing. As another example, the display screen (155) may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

As shown in FIG. 1, multiple input objects (140) may be present in the sensing region (120) at the same time. Moreover, the multiple input objects (140) may be in contact with the surface of the input device (e.g., touch screen, touch pad, etc.) at the same time. One of the input objects (140) may be pressing on the surface with considerable force (i.e., applying considerable force to the surface). The remaining input objects (140) may be simply touching the surface with little force or pressing less hard than the other input object. The one or more actions taken by the processing system (110) and/or the electronic system (not shown) connected to the input device (100) may depend on which input object is pressing on the surface and which input object is just touching the surface. For example, if the input objects are fingers, the position of the pressing finger and the position of the touching finger may be required inputs to one or more processes of a software application (e.g., a software application executing on a mobile device).

Detecting which input object is applying the force to the surface and which input object is merely touching the surface may be further complicated by the bending and/or tilting experience by the surface when the input objects (140) are in contact with the surface. Those skilled in the art, having the benefit of this detailed description, will appreciate that the bending and/or tilting is position dependent (i.e., positions near the edge of the surface behave differently than positions near the center of the surface) and also a function of the material (e.g., plastic) used to manufacture the surface.

Figure 2:
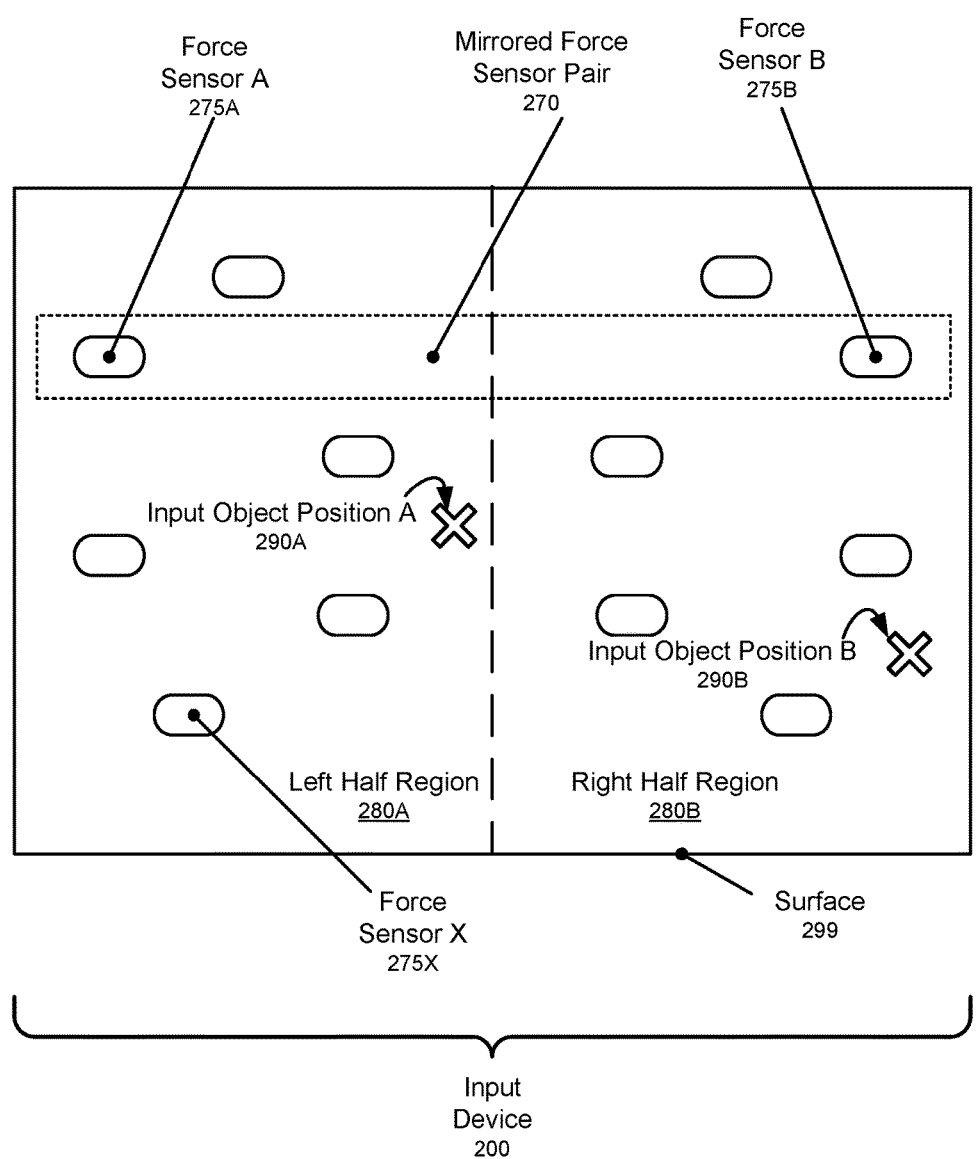

FIG. 2 shows a block diagram of an input device (200) in accordance with one or more embodiments of the invention. The input device (200) may be essentially the same as the input device (100), discussed above with reference to FIG. 1. As shown in FIG. 2, the input device (200) includes a surface (299) and multiple force sensors (e.g., Force Sensor A (275A), Force Sensor B (275B), Force Sensor X (275X)) located below the surface (299). The force sensors (275A, 275B, 275X) may be immediately below the surface (299).

Alternatively, there may be one or more layers separating the surface (299) from the force sensors (275A, 275B, 275X). Each force sensor (275A, 275B, 275X) is connected to the sensor module (160) of the processing system (110), discussed above in reference to FIG. 1.

In one or more embodiments of the invention, each force sensor (275A, 275B, 275X) includes two electrodes separated by a spacing or gap. The spacing may include air. Alternatively, the spacing may be filled with other dielectrics. One electrode is driven as a transmitter ("transmitter electrode") and the other electrode is driven as a receiver ("receiver electrode"). When an input object (e.g., finger) applies a force to the surface (299), either the transmitter electrode or the receiver electrode deflects toward the other electrode, effectively reducing the spacing between the transmitter electrode and the receiver electrode. This reduction in the spacing is reflected in the resulting signal received by the sensor module (160). This change in the spacing may be referred to as the displacement of the force sensor. Moreover, this displacement changes the transcapacitance measured by the processing system (110).

In one or more embodiments of the invention, each force sensor (275A, 275B, 275X) includes two electrodes separated by a spacing or gap. The spacing may include air. Alternatively, the spacing may be filled with other dielectrics. One electrode is operated as an absolute capacitance sensor, while the other electrode is driven with a constant reference voltage. When an input object (e.g., finger) applies a force to the surface (199), one electrode deflects towards the other, effectively reducing the spacing between the electrodes. This reduction in the spacing is reflected in the resulting signal received by the sensor module (160). This change in the spacing may be referred to as the displacement of the force sensor. Moreover, this displacement changes the absolute capacitance measured by the processing system (110).

In one or more embodiments, at least one of the force sensors (275A, 275B, 275X) also operates as a position sensor. For example, the sensor may utilize the same transmitter electrode(s) for both force and position sensing, but have one set of receiver electrodes for force sensing and a different set of receiver electrodes for position sensing. Additionally or alternatively, the transmitter electrodes that are used to detect position may be operated in absolute capacitance sensing mode to detect deflection, resulting from an applied force, towards another electrode. Additionally or alternatively, the transmitter electrodes may be operated as receiver electrodes to receive signals from other transmitters.

Let $d_{ij}$ be the displacement of the force sensor at position (i,j). Displacement is one example of a force value associated with a force sensor. The determination module (150) may determine the displacement for the force sensor as follows:

$$d_{ij} = \frac{(d_0(ij)C_0(ij)/c(ij))^2 \Delta C_{ij}}{f_{ij}(x, y)(m + (d_0(ij)C_0(ij)\Delta C_{ij}/c(ij)))}$$

where $d_0(ij)$ is the designed distance between the two electrodes, $C_0(ij)$ is the original baseline capacitance, $c(ij)$ is the current baseline capacitance, $\Delta C_{ij}$ is the change in the measured capacitance due to the force applied at position (x,y) of the surface (299), m is a parameter that depends on the hardware of the force sensor, and $f_{ij}(x,y)$ is the proportionality factor at position (i,j) when the force is applied at position (x,y) on the surface (299). The proportionality factor may be approximated as 1.

In one or more embodiments of the invention, the determination module (150) determines the positions of any input objects (e.g., fingers) in contact with the surface (299). The positions of the input objects may be determined using positions sensors (not shown). These position sensors (not shown) may be capacitive sensing devices including electrodes that are driven for absolute capacitance or transcapacitance sensing. Additionally or alternatively, as discussed above, the positions of the input objects may be determined using the force sensors (275A, 275B, 275X). In other words, one or more of the force sensors may also be used as a position sensor. Position data and force data (e.g., resulting signals) may be obtained simultaneously or at different times. In FIG. 2, an input object has been identified at position A (290A) and an input object has been identified at position B (290B). However, it is not yet known which input object is applying a force to the surface (299) and which input object is merely touching the surface (299).

In one or more embodiments, the determination module (150) partitions the surface into multiple regions (i.e., left half region (280A), right half region (280B)). The regions might or might not be of the same size. The partitioning may depend on the number of input objects in contact with the surface (299). For example, if two input objects are in contact with the surface (299), the determination module (150) may partition the surface (299) into two regions (280A, 280B), with each region having the position of one of the input objects. Although FIG. 2 shows the surface (299) being partitioned into a left half region (280A) and a right half region (280B), in other embodiments, depending on the positions of the input objects, the surface (299) may be partitioned into a top half region and a bottom half region. More than two regions are also possible.

In one or more embodiments of the invention, the determination module (150) determines an aggregate force metric for each region (280A, 280B) based on force values associated with the force sensors in the region. An aggregate displacement metric (ADM) is one example of an aggregate force metric. Let $ADM_L$ be the aggregate displacement metric for the left half region (280A) and let $ADM_R$ be the aggregate displacement metric for the right half region (280B). The determination module (150) may calculate $ADM_L$ and $ADM_R$ as follows:

$$ADM_L = \Sigma(w_{ij} * d_{ij})$$

for all force sensors in the left half region (280A); and $$ADM_R = \Sigma(w_{ij} * d_{ij})$$

for all force sensors in the right half region (280B), where $w_{ij}$ is a weight to compensate for displacement caused by the bending and tilt of the surface at the position of the force sensor. The weights may be determined a priori, and may be retrieved from the repository (152). Those skilled in the art, having the benefit of this detailed description, will appreciate that similar calculations apply if the surface (299) is partitioned into a top half region and a bottom half region.

In one or more embodiments of the invention, the determination module (150) determines whether the input force is applied in the left region (280A) or the right region (280B) based on $ADM_L$ and $ADM_R$. Specifically, if ($ADM_L > k1 * ADM_R$) and ($ADM_L >$ press threshold), where k1 is a tuned parameter, then the input force is being applied in the left half region (280A). Else if ($ADM_R > k2 * ADM_L$) and ($ADM_R >$ press threshold), where k2 is a tuned parameter, then the input force is being applied in the right half region (280B). In one or more embodiments, k1=k2=1. However, in many embodiments, k1≠k2. Those skilled in the art, having the benefit of this detailed description will appreciate that similar expressions apply if the surface is partitioned into a top half region and a bottom half region.

In one or more embodiments of the invention, the determination module (150) determines which input object is applying the most force to the surface (299), and thus which input object(s) are applying less force or merely touching the surface (299), based on the distances between the positions of the input objects and the region in which the input force is being applied. If the position of the input object is in the region, the distance between the position and the region is zero. The input object that is closest to the region is deemed to be the input object applying the force to (i.e., pressing on) the surface (299).

Those skilled in the art, having the benefit of this detailed description, will appreciate that there are alternate ways of calculating the aggregate force metric (e.g., aggregate displacement metric) for a region. For example, still referring to FIG. 2, the input device (200) includes force sensor A (275A) and force sensor B (275B). These two force sensors (275A, 275B) form a mirrored force sensor pair (270). In other words, the position of force sensor B (275B) in the right half region (280B) mirrors the position of force sensor A (275A) in the left half region (280A). The determination module (150) may calculate $ADM_L$ as follows:

$$ADM_L = \Sigma(d_{ij}/d_{mn})$$

for all force sensors in the left half region (280A), where $d_{mn}$ and $d_{ij}$ are the displacements of the two force sensors in a mirrored pair. If this summation exceeds a tuned parameter, the input force is being applied in the left half region (280A). Alternatively, if this summation is less than a tuned parameter, the input force is being applied the right half region (280B). A ceiling function may be applied to each ratio (i.e., all ratios are capped at the ceiling value) before the summation is executed to reduce the influence of a defective channel in the summation. Similarly, a flooring function may be applied to each displacement. Like before, the input object that is closest to the region in which the force is applied is deemed to be the input object applying the force to (i.e., pressing on) the surface (299).

Figure 3:
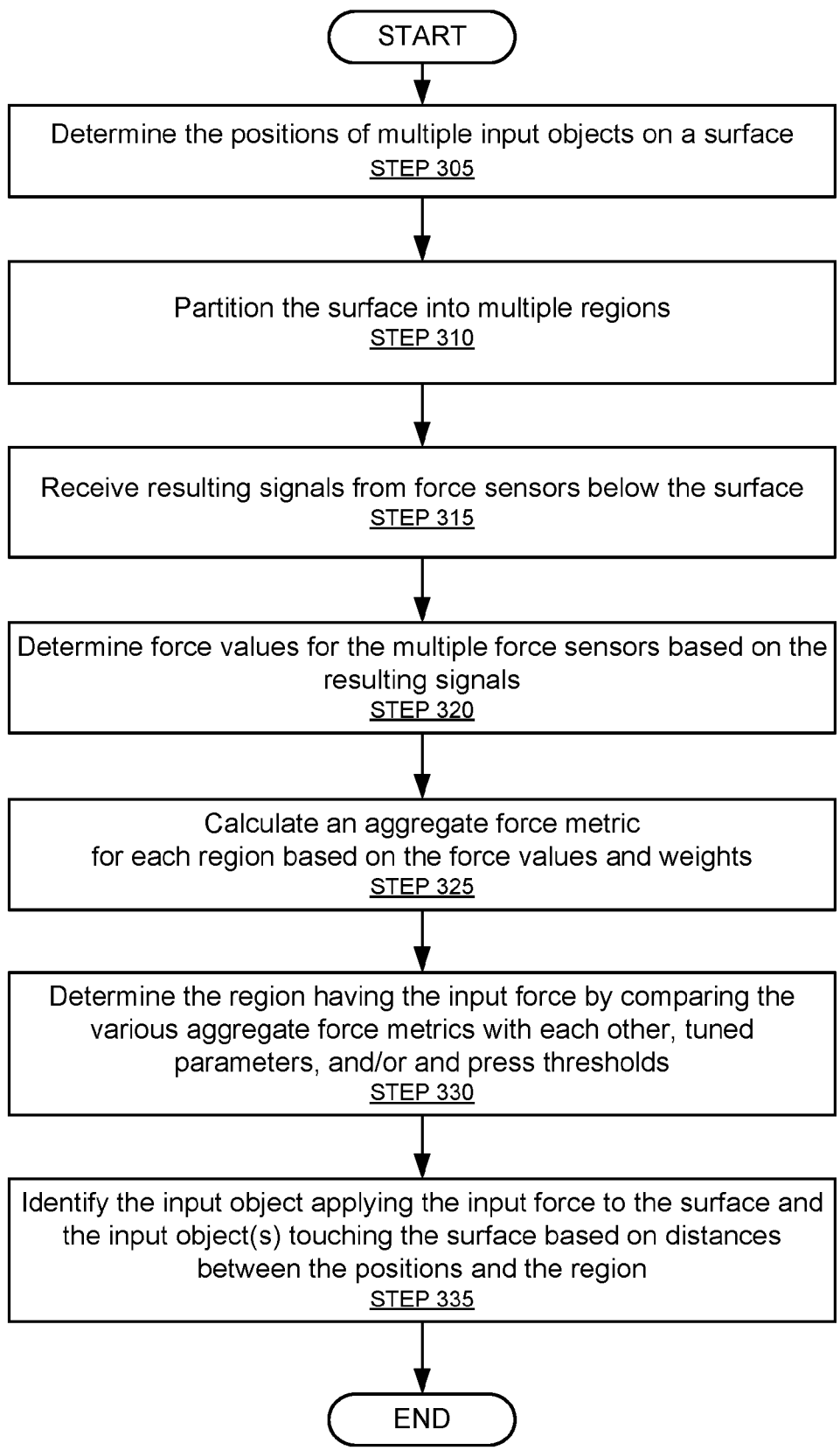
FIG. 3 and FIG. 4 show flowcharts in accordance with one or more embodiments of the invention.

FIG. 3 shows a flowchart in accordance with one or more embodiments of the invention. The flowchart depicts a process for operating an input device (e.g., input device (200)). One or more of the steps in FIG. 3 may be performed by the components of the input system (200), discussed above in reference to FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, the positions of multiple input objects (e.g., multiple fingers) on the surface of the input device are determined (STEP 305). The positions may be determined using capacitive sensing. In other words, the input device may have arrays of electrodes and the changes in the measured transcapacitance or absolute capacitance may be used to detect the positions of the input objects. One of the input objects is applying a force to the surface (i.e., pressing on the surface). The remaining input object is just touching the surface. However, it is currently unknown which input object is applying the force and which input object is merely touching the input surface.

In STEP 310, the surface is partitioned into multiple region. For example, each region may be a vertical or horizontal strip. The regions might or might not be the same size. The number of regions may be dependent on the number of detected input objects. For example, if two fingers are detected, the surface is partitioned into two regions. The surface may be partitioned such that each region includes the position of one detected input object.

In STEP 315, resulting signals are received from the force sensors below the surface. As discussed above, each force sensor may include two electrodes, and the force applied to the surface by the input object causes one electrode to deflect towards the other electrode. This deflection changes the spacing between the electrodes of the force sensor. This change in the spacing is reflected in the resulting signals received from the force sensors. The change in the spacing may also be referred to as the displacement of the force sensor. The force sensors may be the same or different than the positions sensors used to detect the positions (STEP 305) of the input objects. In other words, some sensors of the input device may act as both positional sensors and force sensors.

In STEP 320, a force value for each force sensor is determined. The displacement of the force sensor is one example of a force value. Let $d_{ij}$ be the displacement of the force sensor at position (i,j). The displacement for the force sensor may be calculated as follows:

$$d_{ij} = \frac{(d_0(ij)C_0(ij)/c(ij))^2 \Delta C_{ij}}{f_{ij}(x,y)(m + (d_0(ij)C_0(ij)\Delta C_{ij}/c(ij)))}$$

where $d_0(ij)$ is the designed distance between the two electrodes, $C_0(ij)$ is the original baseline capacitance, $c(ij)$ is the current baseline capacitance, $\Delta C_{ij}$ is the change in the measured capacitance due to the force applied at position (x,y) of the surface (299), m is a parameter that depends on the hardware of the force sensor, and $f_{ij}(x,y)$ is the proportionality factor at position (i,j) when the force is applied at position (x,y) on the surface (299). The proportionality factor may be approximated as 1.

In STEP 325, an aggregate force metric is calculated for each region based on the force values associated of the force sensors in the region and a set of weights. The aggregate force metric may be an aggregate displacement metric and the force values may be displacements. For example, assume the surface is partitioned into a top half region and a bottom half region. Let $ADM_T$ be the aggregate displacement metric for the top half region and left $ADM_B$ be the aggregate displacement metric for the bottom half region. The determination module (150) may calculate $ADM_T$ and $ADM_B$ as follows:

$$ADM_T = \Sigma(w_{ij} * d_{ij})$$

for all force sensors in the top half region, $$ADM_B = \Sigma(w_{ij} * d_{ij})$$

for all force sensors in the bottom half region, where $w_{ij}$ is a weight to compensate for displacement caused by the bending and tilt of the surface at the position of the force sensor.

In STEP 330, the region in which the input force is being applied is determined based on the aggregate force metrics (e.g., $ADM_T$ and/or $ADM_B$). Specifically, if ($ADM_T > k1 * ADM_B$) and ($ADM_T >$ press threshold), where k1 is a tuned parameter, then the input force is being applied in the top half region. Else if ($ADM_B > k2 \cdot ADM_T$) and ($ADM_B >$ press threshold), where k2 is a tuned parameter, then the input force is being applied in the bottom half region.

In STEP 335, the input object applying the most force and the input object applying less force or just touching the surface are determined. Specifically, this determination is made based on the distances between the positions of the input object and the region in which the force is being applied (STEP 330). The input object closest to the region is deemed to be the input object applying the force to (i.e., pressing on) the surface. The remaining input objects are deemed to be applying less force or just touching the surface. The identity of the input object applying the force to the surface and the input object just touching the surface may be inputs to one or more software applications. The software application may perform different actions depending on which input object is pressing on the surface and which input object is merely touching the surface.

In one or more embodiments, if STEP 330 fails, the surface may be repartitioned and STEPS 330 and 335 may be re-executed with the new partitioning. For example, if the surface is initially portioned into horizontal strips, and STEP 330 fails, the surface may be repartitioned into vertical strips and STEP 330 and STEP 335 re-executed.

Figure 4:
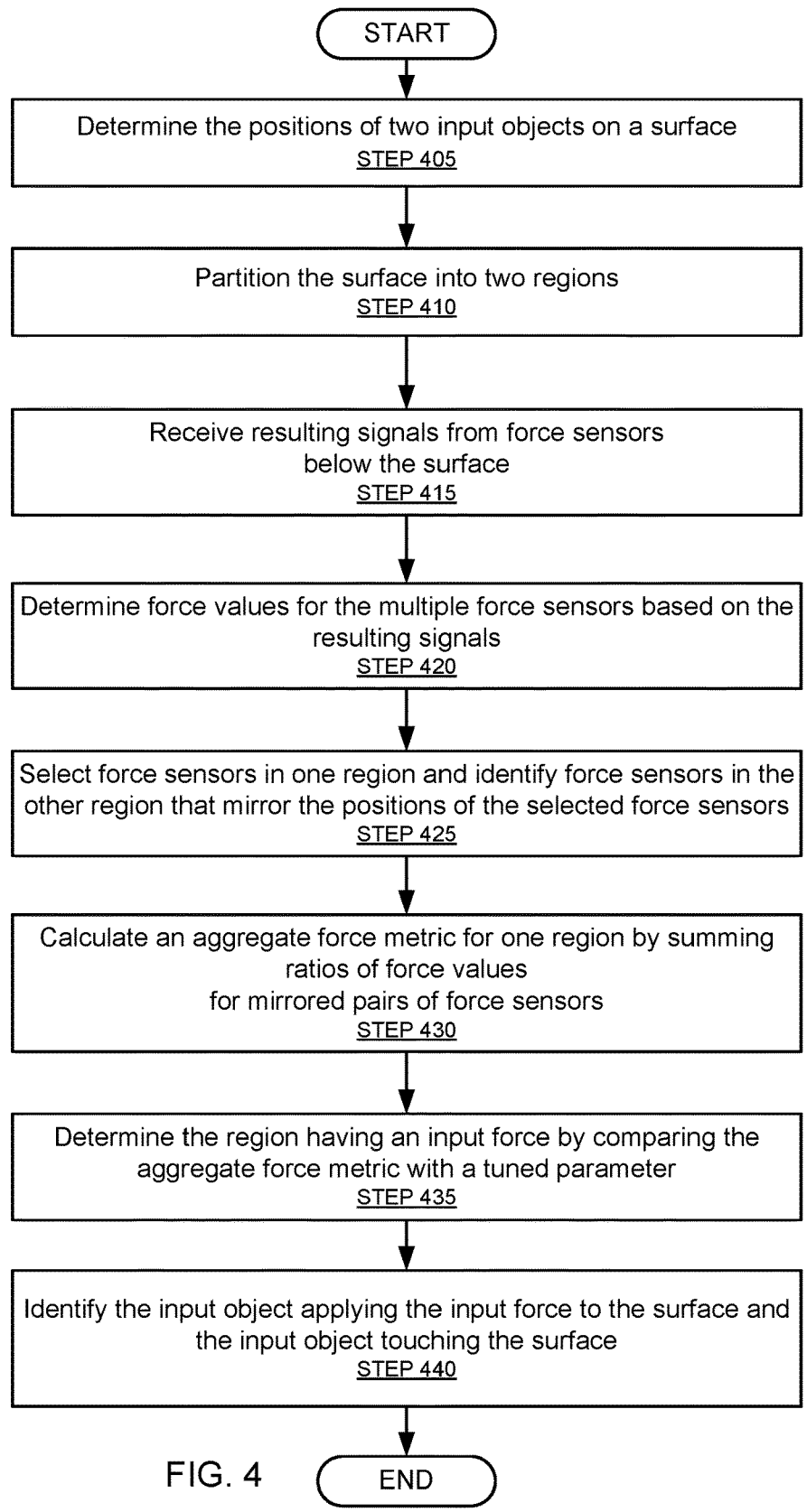

FIG. 4 shows a flowchart in accordance with one or more embodiments of the invention. The flowchart depicts a process for operating an input device (e.g., input device (200)). One or more of the steps in FIG. 4 may be performed by the components of the input device (200), discussed above in reference to FIG. 2. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

STEPS 405, 410, 415, and 420 are essentially the same as STEPS 305, 310, 315, and 320, respectively, discussed above in reference to FIG. 3.

In STEP 425, force sensors are selected in top region, and the force sensors in the bottom region that mirror the positions of the selected force sensors in the top region are identified. In other words, in STEP 425, mirrored force sensor pairs are identified.

In STEP 430, the aggregate force metric for the top half region is calculated based on the mirrored force sensor pairs. One example of the aggregate force metric is the aggregate displacement metric (ADM). Let $ADM_T$ represent the aggregate displacement metric of the top half region. Accordingly, $$ADM_T = \Sigma(d_{ij}/d_{mn})$$

for all force sensors in the top half region, where $d_{mn}$ and $d_{ij}$ are the displacements of the two force sensors in a mirrored pair. A ceiling function may be applied to each ratio (i.e., all ratios are capped at the ceiling value) before the summation is executed to reduce the influence of a bad channel in the summation. Similarly, a flooring function may be applied to each displacement.

In STEP 435, it is determined that the force is being applied in the top half region by comparing the aggregate force metric for the top half region (e.g., $ADM_T$) with a tuned parameter. Specifically, if $ADM_T$ exceeds a tuned parameter, the input force is being applied in the top half region (280A). Alternatively, if this summation is less than a tuned parameter, the input force is being applied the bottom half region.

STEP 440 is essentially the same as STEP 335, discussed above in reference to FIG. 3.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device, comprising:
   sensor circuitry configured to receive resulting signals from a plurality of force sensors of the input device; and
   processing circuitry configured to:
   determine a first position of a first input object and a second position of a second input object on a surface of the input device;
   determine a plurality of force values based on the resulting signals;
   partition the surface into a plurality of regions comprising a first region and a second region;
   calculate a first aggregate force metric for the first region based on a first subset of the plurality of force values;
   determine that the first region comprises an input force based on a first comparison comprising the first aggregate force metric;
   calculate a first distance between the first position and the first region and a second distance between the second position and the first region; and
   determine that the first input object is applying more force to the surface than the second input object in response to the first distance being smaller than the second distance.

2. The processing system of claim 1, wherein calculating the first aggregate force metric comprises:
   selecting a first force sensor in the first region comprising a first force value;
   identifying a second force sensor in the second region of the surface that mirrors the position of the first force sensor and comprises a second force value; and
   calculating a ratio of the first force value to the second force value,
   wherein the first aggregate force metric comprises a summation of ratios,
   wherein the first comparison is between the first aggregate force metric and a tuned parameter, and
   wherein the first aggregate force metric exceeds the tuned parameter.

3. The processing system of claim 2, wherein the determination module also applies a ceiling function to the ratio before executing the summation.

4. The processing system of claim 2, wherein the first region is a left half of the surface, and wherein the second region is a right half of the surface.

5. The processing system of claim 1, wherein the processing circuitry is further configured to:

apply a first plurality of weights to the first subset of the plurality of force values before calculating the first aggregate force metric to compensate for positional bending and tilt;
apply a second plurality of weights to a second subset of the plurality of force values to compensate for positional bending and tilt; and
calculate a second aggregate force metric for the second region of the surface by summing the second subset of the plurality of force values,
wherein the first comparison is between the first aggregate force metric and a product of a tuned parameter and the second aggregate force metric,
wherein the first aggregate force metric exceeds the product.

6. The processing system of claim 5, wherein the first region is a top half of the surface, and wherein the second region is a bottom half of the surface.

7. The processing system of claim 5, wherein the processing circuitry is further configured to partition the surface into the first region and the second region based on the first position and the second positions, wherein the first region comprises the first position and the second region comprises the second position.

8. The processing system of claim 5, wherein the processing circuitry is further configured to:
execute a second comparison comprising the first aggregate force metric and a press threshold,
wherein the first aggregate force metric exceeds the press threshold, and
wherein determining that the first region comprises the input force is further based on the second comparison.

9. A method for operating a processing system for an input device comprising a surface, comprising:
determining a first position of a first input object and a second position of a second input object on the surface;
receiving a plurality of resulting signals from a plurality of force sensors;
determining a plurality of force values for the plurality of force sensors based on the plurality of resulting signals;
partitioning the surface into a plurality of regions comprising a first region and a second region;
calculating a first aggregate force metric for the first region of the surface based on a first subset of the plurality of force values;
determining that the first region comprises an input force based on a first comparison comprising the first aggregate force metric;
calculating a first distance between the first position and the first region and a second distance between the second position and the first region; and
determining that the first input object is applying more force to the surface than the second input object in response to the first distance being smaller than the second distance.

10. The method of claim 9, wherein calculating the first aggregate force metric comprises:
selecting a first force sensor in the first region comprising a first force value;
identifying a second force sensor in the second region of the surface that mirrors the position of the first force sensor and comprises a second force value; and
calculating a ratio of the first force value to the second force value,
wherein the first aggregate force metric comprises a summation of ratios,
wherein the first comparison is between the first aggregate force metric and a tuned parameter, and
wherein the first aggregate force metric exceeds the tuned parameter.

11. The method of claim 9, further comprising:
applying a first plurality of weights to the first subset of the plurality of force values before calculating the first aggregate force metric to compensate for positional bending and tilt;
applying a second plurality of weights to a second subset of the plurality of force values to compensate for positional bending and tilt; and
calculating a second aggregate force metric for the second region of the surface by summing the second subset of the plurality of force values,
wherein the first comparison is between the first aggregate force metric and a product of a tuned parameter and the second aggregate force metric, and
wherein the first aggregate force metric exceeds the product.

12. The method of claim 11, further comprising:
executing a second comparison comprising the first aggregate force metric and a press threshold,
wherein the first aggregate force metric exceeds the press threshold, and
wherein determining the first region comprises the input force is further based on the second comparison.

13. The method of claim 12, further comprising:
partitioning the surface into the first region and the second region based on the first position and the second position,
wherein the first region comprises the first position, and
wherein the second region comprises the second position.

14. The method of claim 9, further comprising:
executing, by a software application, an action in response to determining that the first input object is applying more force to the surface than the second input object.

15. An input device, comprising:
a surface;
a plurality of force sensors below the surface; and
a processing system that:
determines a first position of a first input object and a second position of a second input object on the surface;
receives a plurality of resulting signals from the plurality of force sensors;
determines a plurality of force values for the plurality of force sensors based on the plurality of resulting signals;
partitions the surface into a plurality of regions comprising a first region and a second region;
calculates a first aggregate force metric for a first region of the surface based on a first subset of the plurality of force values;
determines the first region comprises an input force based on a first comparison comprising the first aggregate force metric;
calculates a first distance between the first position and the first region and a second distance between the second position and the first region; and
determines that the first input object is applying more force to the surface than the second input object in response to the first distance being smaller than the second distance.

16. The input device of claim 15, wherein calculating the first aggregate force metric comprises:

selecting a first force sensor in the first region comprising a first force value;

identifying a second force sensor in the second region of the surface that mirrors the position of the first force sensor and comprises a second force value; and calculating a ratio of the first force value to the second force value, wherein the first aggregate force metric comprises a summation of ratios, wherein the first comparison is between the first aggregate force metric and a tuned parameter, and wherein the first aggregate force metric exceeds the tuned parameter.

17. The input device of claim 15, wherein the processing system also:

applies a first plurality of weights to the first subset of the plurality of force values before calculating the first aggregate force metric to compensate for positional bending and tilt;

applies a second plurality of weights to a second subset of the plurality of force values to compensate for positional bending and tilt; and calculates a second aggregate force metric for the second region of the surface by summing the second subset of the plurality of force values, wherein the first comparison is between the first aggregate force metric and a product of a tuned parameter and the second aggregate force metric, and wherein the first aggregate force metric exceeds the product.

18. The input device of claim 15, wherein the processing system also:

partitions the surface into the first region and the second region based on the first position and the second position, wherein the first region comprises the first position and the second region comprises the second position;

executes a second comparison comprising the first aggregate force metric and a press threshold, wherein the first aggregate force metric exceeds the press threshold, and wherein determining the first region comprises the input force is further based on the second comparison.

19. The input device of claim 15, wherein at least one of the plurality of force sensors comprises:

a first electrode driven as a transmitter; and a second electrode driven as a receiver and separated from the first electrode by a spacing, wherein at least one selected from a group consisting of the first electrode and the second electrode deflects in response to the force and reduces the spacing, and the resulting signal for the force sensor reflects transcapacitance.

20. The input device of claim 15, wherein at least one of the plurality of force sensors comprises:

a first electrode driven as an absolute capacitance sensor; and a second electrode driven with a reference voltage and separated from the first electrode by a spacing, wherein at least one selected from a group consisting of the first electrode and the second electrode deflects in response to the force and reduces the spacing, and the resulting signal for the force sensor reflects absolute capacitance.

* * * * *